United States Patent
Hashimoto et al.

(10) Patent No.: US 11,232,007 B2
(45) Date of Patent: Jan. 25, 2022

(54) SERVER SYSTEM AND METHOD OF SWITCHING SERVER

(71) Applicant: FUJITSU LIMITED, Kawasaki (JP)

(72) Inventors: Naoki Hashimoto, Kobe (JP); Takashi Tokuda, Yokohama (JP); Daisuke Ninomiya, Kobe (JP); Kazuhiro Taniguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 16/364,380

(22) Filed: Mar. 26, 2019

(65) Prior Publication Data

US 2019/0310926 A1    Oct. 10, 2019

(30) Foreign Application Priority Data

Apr. 10, 2018    (JP) .............................. JP2018-075159

(51) Int. Cl.
  *G06F 11/20* (2006.01)
  *G06F 16/178* (2019.01)
  *G06F 16/182* (2019.01)

(52) U.S. Cl.
  CPC ...... *G06F 11/2097* (2013.01); *G06F 11/2033* (2013.01); *G06F 11/2074* (2013.01);
  (Continued)

(58) Field of Classification Search
  CPC ............. G06F 11/1471; G06F 11/2076; G06F 11/2041; G06F 11/2033; G06F 11/2097; G06F 11/2074; G06F 11/2094
  See application file for complete search history.

(56) References Cited

U.S. PATENT DOCUMENTS

| 7,124,258 B2 * | 10/2006 | Nakayama | .............. G06F 3/067 |
| | | | 711/154 |
| 8,713,288 B2 * | 4/2014 | Yoshihara | .............. G06F 3/0659 |
| | | | 712/30 |

(Continued)

FOREIGN PATENT DOCUMENTS

| JP | 2006-309439 | 11/2006 |
| JP | 2009-9599 | 1/2009 |

(Continued)

OTHER PUBLICATIONS

JPOA—Office Acion of Japanese Patent Application No. 2018-075159 dated Dec. 7, 2021 with Full Machine Translation.

*Primary Examiner* — Nadeem Iqbal
(74) *Attorney, Agent, or Firm* — Fujitsu Patent Center

(57) ABSTRACT

A server system includes a primary server, at least one synchronous backup server, and at least one asynchronous backup server. The primary server includes a first processor. The at least one synchronous backup server, each includes a second processor configured to back up data of the primary server in a synchronous manner. The at least one asynchronous backup server, each includes a third processor configured to back up data of the primary server in an asynchronous manner. The first processor is configured to control each of one or more of the at least one asynchronous backup server to operate as a synchronous backup server when a number of the at least one synchronous backup server decreases due to a failure in at least one server included in the server system.

20 Claims, 11 Drawing Sheets

(52) U.S. Cl.
CPC ........ *G06F 11/2076* (2013.01); *G06F 16/178* (2019.01); *G06F 16/1844* (2019.01)

(56) References Cited

U.S. PATENT DOCUMENTS

| | | | | |
|---|---|---|---|---|
| 9,015,373 | B2* | 4/2015 | Deguchi | G06F 3/067 |
| | | | | 710/45 |
| 10,338,851 | B1* | 7/2019 | Kronrod | G06F 3/0659 |
| 2002/0099729 | A1 | 7/2002 | Chandrasekaran et al. | |
| 2007/0233699 | A1* | 10/2007 | Taniguchi | G06F 16/27 |
| 2012/0131379 | A1 | 5/2012 | Tameshige et al. | |
| 2013/0036324 | A1* | 2/2013 | Nagasawa | H04L 67/32 |
| | | | | 714/4.11 |
| 2019/0303490 | A1* | 10/2019 | Chen | G06F 16/275 |

FOREIGN PATENT DOCUMENTS

| | | |
|---|---|---|
| JP | 2011-141609 | 7/2011 |
| JP | 2012-185560 | 9/2012 |
| JP | 2013-037433 | 2/2013 |
| JP | 2016-051448 | 4/2016 |

* cited by examiner

| IDENTIFICATION INFORMATION | OPERATION MODE |
|---|---|
| NODE#0 | PRIMARY |
| NODE#1 | SYNCHRONOUS STANDBY |
| NODE#2 | SYNCHRONOUS STANDBY |
| NODE#3 | ASYNCHRONOUS STANDBY |
| NODE#4 | SYNCHRONOUS STANDBY |
| NODE#5 | SYNCHRONOUS STANDBY |
| NODE#6 | ASYNCHRONOUS STANDBY |

SERVER SYSTEM AND METHOD OF SWITCHING SERVER

CROSS-REFERENCE TO RELATED APPLICATION

This application is based upon and claims the benefit of priority of the prior Japanese Patent Application No. 2018-075159, filed on Apr. 10, 2018, the entire contents of which are incorporated herein by reference.

FIELD

The embodiments discussed herein are related to a server system and a method of switching a server.

BACKGROUND

A cluster system that constitutes a multiplexing environment by plural nodes, for example, plural DB (database) servers, may use a multi-synchronous standby function to implement an improvement of availability corresponding to the number of nodes constituting the cluster system.

The multi-synchronous standby function is a technique for reconstructing the cluster configuration in the event of an abnormality in a node in the multiplexing environment that includes a primary server and one or more standby servers. For example, a failover and fallback are known as techniques adopted in the multi-synchronous standby function.

The failover is a method of switching one of the standby servers to a primary server and continuing a task with the new primary server when an original primary server fails. In the failover, switching from a standby server to a primary server is performed each time a primary server fails until the active standby servers disappear.

"Switching" the standby server to the primary server may refer to switching (controlling) a function to cause a node operating as a standby server to operate as a primary server.

The fallback is a method of degenerating, when a standby server fails, the failed standby server and securing a DB redundancy by the remaining standby servers.

The availability of a cluster system adopting the multi-synchronous standby function is improved in proportion to the increase in the number of standby servers.

Related techniques are disclosed in, for example, Japanese Laid-open Patent Publication No. 2006-309439, Japanese Laid-open Patent Publication No. 2016-051448, Japanese Laid-open Patent Publication No. 2013-037433, and Japanese Laid-open Patent Publication No. 2011-141609.

When a DB of a primary server is updated in a DB updating task for the cluster system by a terminal, the primary server performs a synchronizing process to reflect the update in a DB of a standby server.

Therefore, by increasing the number of standby servers, while the availability of the cluster system is improved, the processing load of the synchronizing process by the primary server may increase and the DB updating performance may degrade, which may make it difficult to achieve an efficient server switching.

SUMMARY

According to an aspect of the present invention, provide is a server system including a primary server, at least one synchronous backup server, and at least one asynchronous backup server. The primary server includes a first memory and a first processor coupled to the first memory. The at least one synchronous backup server, each includes a second memory and a second processor coupled to the second memory. The second processor is configured to back up data of the primary server in a synchronous manner. The at least one asynchronous backup server, each includes a third memory and a third processor coupled to the third memory. The third processor is configured to back up data of the primary server in an asynchronous manner. The first processor is configured to control each of one or more of the at least one asynchronous backup server to operate as a synchronous backup server when a number of the at least one synchronous backup server decreases due to a failure in at least one server included in the server system.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of node information;

DESCRIPTION OF EMBODIMENTS

Figure 1:
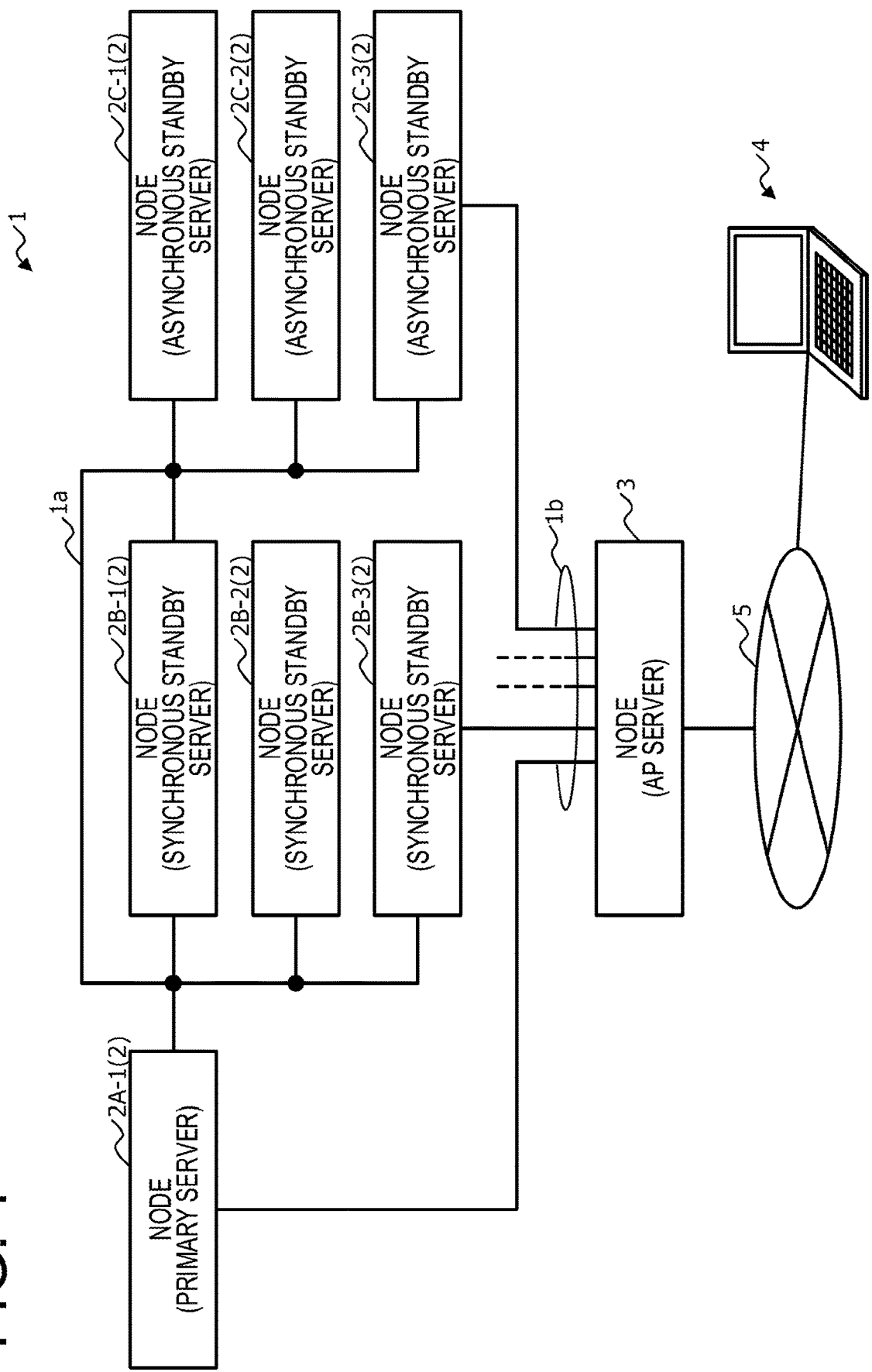
FIG. 1 is a block diagram illustrating a configuration example of a cluster system according to an embodiment.

Hereinafter, embodiments of the present disclosure will be described with reference to the accompanying drawings. However, the embodiments described below are merely examples and are not intended to exclude the application of various modifications and techniques not explicitly described below. For example, the disclosed embodiments may be implemented with various modifications without departing from the spirit and scope of the present disclosure. Throughout the drawings used in the following embodiments, the same or similar parts are denoted by the same reference numerals unless otherwise specified.

[1] Embodiment

[1-1] Configuration Example of Cluster System

FIG. 1 is a block diagram illustrating a configuration example of a cluster system 1 according to an embodiment. As illustrated in FIG. 1, the cluster system 1 is an example of a server system, and may include, for example, a plurality of nodes 2 constituting a cluster (seven nodes 2 in the example of FIG. 1), and one or more nodes 3 (one node 3 in the example of FIG. 1).

Each of the plurality of nodes 2 is, for example, a DB server in which software such as a database management system (DBMS) is installed, and may use a multi-synchronous standby function. A DB multiplexing environment may be implemented by the DBMS executed in the plurality of nodes 2.

The plurality of nodes 2 may be communicably connected to each other by an interconnect, for example, a network 1a such as a LAN (local area network).

Each node 2 is variably assigned a function type (role) of any one of a primary server, one or more synchronous standby servers, and one or more asynchronous standby servers, and may operate as a server of the assigned type.

In the example of FIG. 1, it is assumed that one node 2A-1 operates as a primary server, three nodes 2B-1 to 2B-3 operate as a synchronous standby server, and three nodes 2C-1 to 2C-3 operate as an asynchronous standby server.

In the following description, a node 2 operating as a primary server may sometimes be referred to as a "node 2A" or a "primary server 2A". A node 2 operating as a synchronous standby server may sometimes be referred to as a "node 2B" or a "synchronous server 2B". A node 2 operating as an asynchronous standby server may sometimes be referred to as a "node 2C" or an "asynchronous server 2C". A node 2 may sometimes be referred to as a "server 2" or a "DB server 2".

The primary server 2A is an example of an active node managing the master data of a DB. The primary server 2A performs a process of updating the DB of the primary server 2A according to a DB updating task. The DB updating task may be executed, for example, by a terminal 4 illustrated in FIG. 1 that accesses the primary server 2A via a network 5 and a node 3.

In addition to the DB updating process, the primary server 2A performs a synchronizing process for the nodes 2 that constitute the cluster. As an example, in the synchronizing process, the primary server 2A may transmit (e.g., broadcast) update result information related to the updating process (e.g., log of WAL) to the synchronous server 2B and the asynchronous server 2C.

The term "WAL" is an abbreviation for Write Ahead Logging, which is a transaction log written prior to writing in the DB. Hereinafter, it is assumed that the synchronizing process is performed using the WAL.

One or more synchronous servers 2B are an example of at least one synchronous backup server which is a standby system node group reserved for the active node and backs up data of the primary server 2A in a synchronous manner. Upon receiving the WAL from the primary server 2A, each synchronous server 2B may transmit a response indicating that the transfer of log has been completed (log transfer completion response), to the primary server 2A.

A log transfer response indicating that the synchronous server 2B has received the WAL may be transmitted, for example, at the timing when the synchronous server 2B receives the WAL. Alternatively, the log transfer response may be transmitted, for example, at the timing when the DB updating process of the synchronous server 2B has been completed using the WAL received by the synchronous server 2B.

Upon receiving the log transfer completion response from all the synchronous servers 2B among WAL transmission destination nodes 2, the primary server 2A may determine that the synchronizing process has been completed and may terminate the transaction of the synchronizing process. This may ensure a data synchronization (data identity) between the primary server 2A and the synchronous server 2B.

One or more asynchronous servers 2C is an example of at least one asynchronous backup server which is an asynchronous standby system node group reserved for the standby system node group and backs up data of the primary server 2A in an asynchronous manner. Upon receiving the WAL from the primary server 2A, each asynchronous server 2C may update the DB of the asynchronous server 2C using the received WAL.

For an asynchronous server 2C among the WAL transmission destination nodes 2, the primary server 2A may not wait for a response from the asynchronous server 2C and may terminate the transaction of the synchronizing process by receiving a response from all the synchronous servers 2B. For each asynchronous server 2C, there may be no need of transmission of a log transfer completion response to the primary server 2A in the case of receiving the WAL.

Since the primary server 2A waits to receive the log transfer completion response from the synchronous server 2B in the synchronizing process, as the number of synchronous server 2B increases, the processing load of the primary server 2A increases and the number of resources available for the updating process decreases, which may cause a high risk of unstable response of the updating process.

Therefore, in the cluster system 1 according to an embodiment, the number of operating synchronous servers 2B may be adjusted and determined to an optimum upper limit (number) in consideration of the balance between the performance requirement of the updating task and the simultaneous failure durability. As a result, it is possible to reduce an increase in the processing load on the primary server 2A and suppress a decrease in resources available for the updating process, so that a stable response may be secured in the updating process.

Details of the nodes 2 such as the primary server 2A, the synchronous server 2B, and the asynchronous server 2C will be described later.

The terminal 4 or another terminal (not shown) may execute a DB referencing task by accessing the synchronous server 2B via, for example, the network 5 and the node 3. Further, the cooperation of the DB multiplexing environment in the multi-synchronous standby function may be performed only by the nodes 2 other than the synchronous server 2B (e.g., the asynchronous server 2C).

The node 3 is, for example, an application (hereinafter, referred to as an "AP") server. The node 3 may provide an interface (IF) to the cluster system 1 for the terminal 4 or another terminal. In the following description, the node 3 may sometimes be referred to as an "AP server 3".

The AP server 3 and each of the plural nodes 2 may be connected so as to communicate with each other by a network 1b. The network 1b may be the same interconnect as or a different interconnect from the network 1a, such as a LAN.

The AP server 3 may specify the primary server 2A which is the access destination of the updating task and the synchronous server 2B which is the access destination of the referencing task from the plural nodes 2, and may switch the access connection destination from the terminal 4 or another terminal to the specified node 2. For example, the AP server 3 may refer to or receive node information 212 (see, e.g., FIG. 2) from the node 2, and may determine an operation mode of each node 2, such as "primary", "synchronous standby", or "asynchronous standby" (synchronization attribute), based on the node information 212.

The terminal 4 is a computer used by a user of a DB provided by the cluster system 1. An example of the terminal 4 may include an information processing apparatus such as a user PC (personal computer), a server, a smart phone, or a tablet.

The network 5 may be at least one of the Internet and an intranet including, for example, a LAN or a WAN (Wide Area Network), or a combination thereof. Further, the network 5 may include a virtual network such as a VPN (virtual private network). The network 5 may be formed by one or both of a wired network and a wireless network.

[1-2] Configuration Example of DB Server

Next, a configuration example of a node 2 as the DB server 2 will be described with reference to FIG. 2. Since each node 2 illustrated in FIG. 1 may operate as any of the primary server 2A, the synchronous server 2B, and the asynchronous server 2C by switching of the operation mode, an example of the functional configuration including the functions of these servers 2A to 2C will be described below. Depending on, for example, the configuration, environment, and operation of the cluster, the functional configuration of each node 2 may be restricted to a functional configuration for implementing one or two of the servers 2A to 2C.

Figure 2:
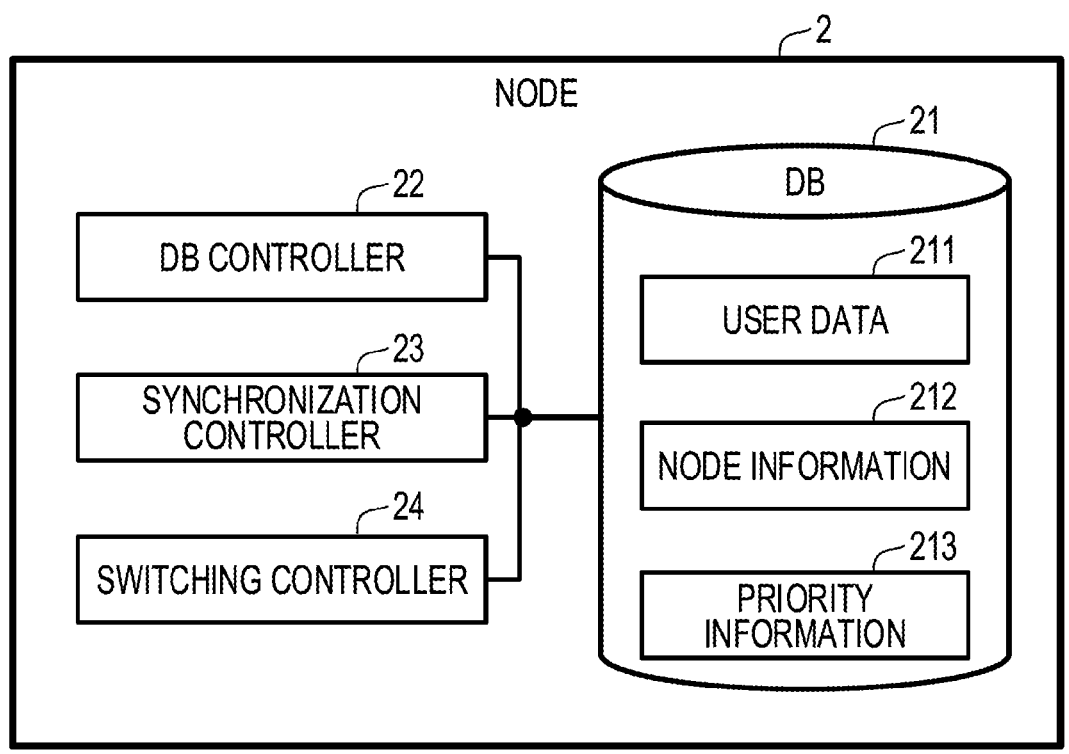
FIG. 2 is a block diagram illustrating a configuration example of a node according to an embodiment.

As illustrated in FIG. 2, the node 2 may include, for example, a DB 21, a DB controller 22, a synchronization controller 23, and a switching controller 24.

The DB 21 is a database provided by the cluster system 1 and may store user data 211 such as task data. The user data 211 stored in the DB 21 of the primary server 2A may be handled as master data, and the user data 211 stored in the synchronous server 2B or the asynchronous server 2C may be handled as synchronous backup or asynchronous backup of the master data.

In addition, the DB 21 according to the embodiment may store, for example, node information 212 and priority information 213 as information used for the processing of the DB controller 22, the synchronization controller 23, and the switching controller 24.

An example of the DB 21 may include one or both of a memory, for example, a volatile memory such as a RAM (random access memory), and a storage unit, for example, a storage device such as an HDD (hard disk drive) or an SSD (solid state drive). The user data 211, the node information 212, and the priority information 213 may be stored in one DB 21 or may be distributedly stored in plural DBs 21 (not illustrated). Further, the node information 212 and the priority information 213 may not be stored in a DB.

The DB controller 22 performs various controls related to the DB 21.

For example, the DB controller 22 of the primary server 2A may create a log such as the WAL based on an update instruction from the terminal 4 and may perform an updating process of the user data 211 (e.g., addition, deletion or update of data) based on the update instruction in the updating task.

The DB controller 22 of the synchronous server 2B and the asynchronous server 2C, respectively, may perform the updating process of the user data 211 stored in the DBs 21 of the synchronous server 2B and the asynchronous server 2C based on the WAL received by the synchronization controller 23 from the primary server 2A.

The synchronization controller 23 performs various controls related to data synchronization between the nodes 2.

For example, the synchronization controller 23 of the primary server 2A starts a synchronizing process according to an update instruction and may transmit (e.g., broadcast) the WAL generated by the DB controller 22 to the synchronous server 2B and the asynchronous server 2C. Further, the synchronization controller 23 may wait for reception of a transfer completion response from each synchronous server 2B and may terminate the synchronizing process upon receiving the transfer completion response from all the synchronous servers 2B.

The primary server 2A may refer to, for example, the node information 212 stored in the DB 21 (see, e.g., FIG. 2) to determine whether the operation mode of each of the plural nodes 2 is for the synchronous server 2B or for the asynchronous server 2C.

FIG. 3 is a view illustrating an example of the node information 212. As illustrated in FIG. 3, the node information 212 may include, for example, identification information that identifies a node 2 and an item of the operation mode of the node 2. The node information 212 may be managed by a DBMS, and the update of the operation mode may be updated according to the execution of the failover or fallback in, for example, the multi-synchronous standby function.

In the node information 212, the information (entry) of "primary" may be omitted. The operation modes of the primary server 2A, the synchronous server 2B, and the asynchronous server 2C may be determined (decided) according to the DB state, for example, according to the presence or absence of "recovery.conf" in the DB in case of PostgreSQL. The term "recovery.conf" refers to a setting file related to recovery and is set in slave nodes 2 such as the synchronous server 2B and the asynchronous server 2C. Therefore, each node 2 may determine the operation mode of a node 2 where "recovery.conf" does not exist, as "primary".

As the synchronizing process, the synchronization controllers 23 of the synchronous server 2B and the asynchronous server 2C may wait for reception of the WAL, receive the WAL from the primary server 2A, output the received WAL to the DB controller 22, and cause the DB controller 22 to execute the updating process. Further, the synchronization controller 23 of the synchronous server 2B may transmit a transfer completion response to the primary server 2A at the timing when the WAL has been received or at the timing when the updating process by the DB controller 22 has been completed.

The switching controller 24 performs various controls related to switching of the operation mode of a node 2. For example, the switching controller 24 may determine a degeneration destination (switching destination) node 2 when degenerating a failed node 2 during the failover or fallback.

Figure 4:
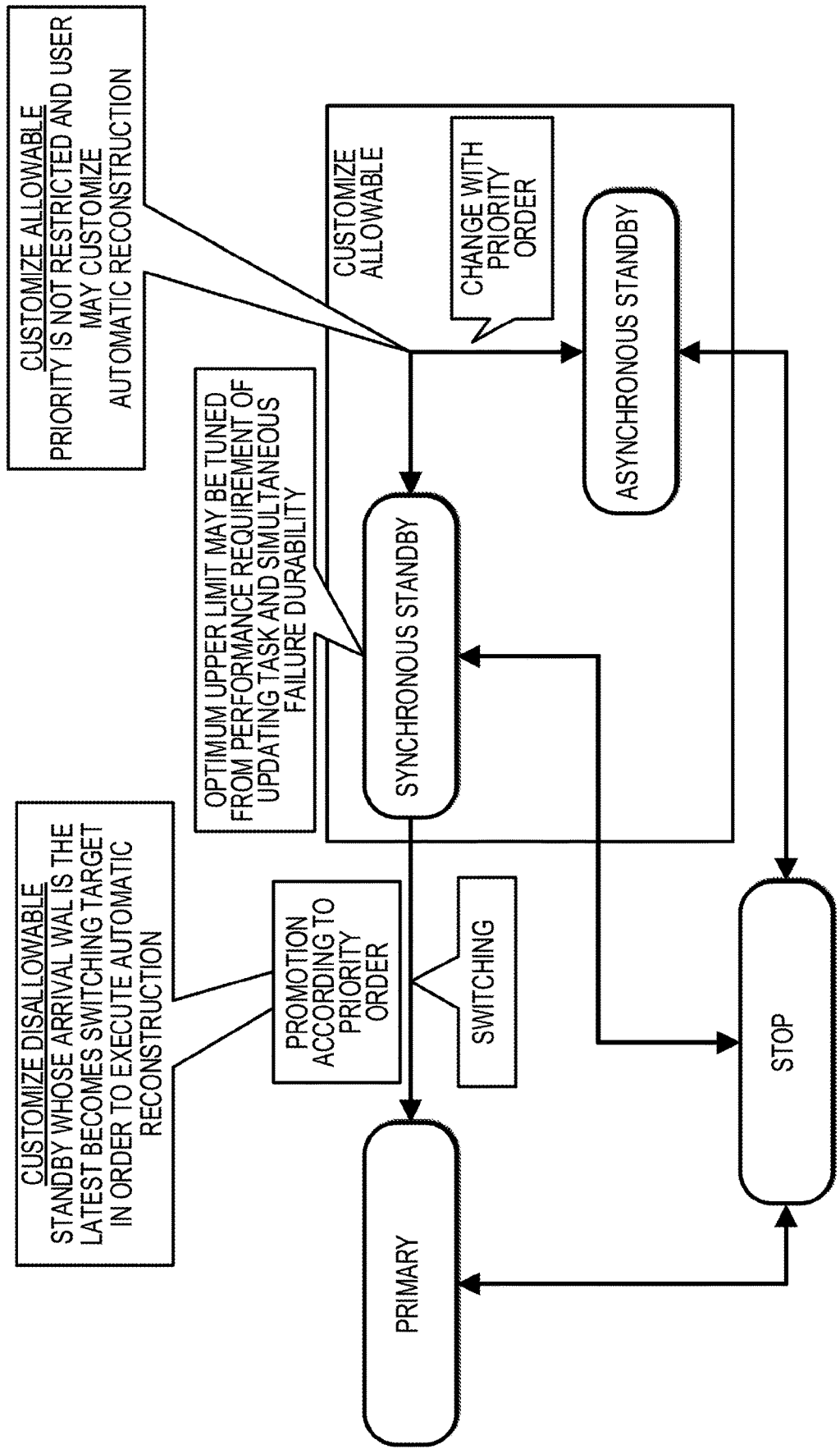
FIG. 4 is a view illustrating an example of state transition of a DB instance according to an embodiment.

FIG. 4 is a view illustrating an example of a state transition of a DB instance (switching of operation mode) according to an embodiment.

As illustrated in FIG. 4, the switching controller 24 may switch the state of the node 2 from "primary", "synchronous standby", or "asynchronous standby" to "stop" according to a failure or a power OFF control of the node 2. Further, the switching controller 24 may switch the state of the node 2 from "stop" to "primary", "synchronous standby", or "asynchronous standby" according to a failure recovery, an incorporation, or a power ON control of the node 2.

Further, the switching controller 24 may select one of the plural nodes 2, which is in the "synchronous standby" state, and may switch the selected node 2 to the "primary" state according to a failure or a power OFF control of the node 2 which is in the "primary" state.

In promotion from "synchronous standby" to "primary", in order to suppress the influence on the updating task by the reconstruction of the state (operation mode), for example, the synchronous server 2B whose arrival WAL is latest may be preferentially selected as a switching target node 2.

Further, the switching controller 24 may execute the state reconstruction based on the priority order between a node 2 in the "synchronous standby" state and a node 2 in the "asynchronous standby" state.

For example, in response to an occurrence of a failure or a promotion to "primary" of the node 2 which is in the "synchronous standby" state, the switching controller 24 may switch (promote) one node 2, which is in the "asynchronous standby" state, to the "synchronous standby" state. In other words, the switching controller 24 switches nodes 2, which are in the "asynchronous standby" state, as many as nodes 2 which are in the reduced "synchronous standby" state, to the "synchronous standby" state. At this time, the switching controller 24 may select a node 2 whose arrival WAL is latest, as a node 2 to be switched in the operation mode.

In addition, the switching controller 24 may switch (demote) a node 2 having an old arrival WAL or a low synchronization performance, of the nodes which are in the "synchronous standby" state, to the "asynchronous standby" state. In this case, the switching controller 24 may switch a node 2 whose arrival WAL is newer than a node 2 to be switched to the "asynchronous standby" state, of the nodes 2 which are in the "asynchronous standby" state, to the "synchronous standby" state.

For example, when the primary server 2A is in a normal condition, the switching controller 24 of the primary server 2A (in the case where the primary server 2A is switched, the switched primary server 2A) may execute the above-described process. In the meantime, when a fault occurs in the primary server 2A, the switching controllers 24 of the plural synchronous servers 2B may cooperatively execute the above-described process.

In addition, in order to secure a simultaneous failure durability, when a failure occurs in the plural nodes 2, the cluster system 1 according to the embodiment may perform the above-described processes in combination based on the number of failed nodes 2 or the operation mode of the failed node 2.

For example, when a failure occurs in plural synchronous servers 2B, the switching controller 24 of the primary server 2A may switch the asynchronous servers 2C corresponding to (same as) the number of failed synchronous servers 2B in the order of latest arrival WAL, to the synchronous servers 2B.

Further, when a failure occurs in the primary server 2A and one or more synchronous servers 2B, switching control may be performed by the following procedures (i) and (ii).

(i) As described above, the switching controllers 24 of the plural synchronous servers 2B cooperate with each other to promote one synchronous server 2B to a new primary server 2A.

(ii) The new primary server 2A switches the asynchronous servers 2C corresponding to the number obtained by adding "1" (the number of synchronous servers 2B reduced in the procedure (i)) to the number of one or more failed synchronous servers 2B, to the synchronous servers 2B in the order of latest arrival WAL.

In addition, the switching controller 24 may acquire the information of the WAL (arrival WAL) of each of the nodes 2 by referring to the priority information 213 stored in, for example, the DB 21 (see, e.g., FIG. 2).

The priority information 213 is an example of information indicating the synchronization state of the primary server 2A of its own node 2. The synchronization state of the primary server 2A may be determined based on the WAL information. For example, the priority information 213 may be set with a WAL number including a number portion that is different (e.g., sequentially increased) for each WAL. The WAL number may be, for example, a file name of the WAL. In addition, the WAL itself may be used as the priority information 213, in which the priority information 213 (WAL) may be managed as a portion of the user data 211.

A WAL having a larger number portion in the WAL number is a newer WAL. Therefore, it may be said that a node 2 having the WAL number closer to the newest number is a node 2 with lower latency, higher transfer efficiency, and higher priority as the degeneration destination.

In this way, by reconstructing the nodes 2 in the "synchronous standby" and "asynchronous standby" states at the timing of degeneration or incorporation of the nodes 2 with the cluster system 1 according to the embodiment, it is possible to maintain a high availability of the cluster system 1. In the embodiment, since the switching of the primary server 2A is performed by the failover (or planned manual switching), it is possible to implement a non-stop operation of the referencing task at the time of degeneration.

Further, as for a rule of selection of a node 2 of "asynchronous standby" as the degeneration destination from a node 2 of "synchronous standby", for example, a tuning with priority may be performed, such as limiting a node 2 of a degeneration destination candidate to a node 2 to which the latest WAL has been applied. This makes it possible to implement an operation that satisfies the operation requirements of each of the nodes 2 of "synchronous standby" and "asynchronous standby" (e.g., the priority of the referencing task).

Further, the switching controller 24 determines the priority order in a case of promoting an asynchronous server 2C to a synchronous server 2B according to, for example, the failover by an evaluation based on the latency of the WAL transfer in which the synchronous server 2B affects the updating task. For example, when the cluster system 1 is implemented in a cloud environment where the line performance is not stable, it is effective to optimize the operation mode of each node 2 by such a best effort method.

It has been described above that an asynchronous server 2C whose WAL arrival order is close to the latest is switched to a synchronous server 2B at the timing when the failover is performed, but the present disclosure is not limited thereto.

For example, based on the past statistical information, an asynchronous server 2C having low latency may be switched to a synchronous server 2B at the timing when the failover is performed. The past statistical information may include, for example, various information such as a throughput of each node 2 (processing amount per unit time) in the past specific period, a central processing unit (CPU) usage rate, and WAL arrival time. The past statistical information may be stored in the DB 21 as, for example, the priority information 213.

Thus, since an asynchronous server 2C having a large load may be excluded from the object to be switched to a synchronous server 2B based on the past statistical information, it is possible to suppress the performance degradation of the cluster system 1. In addition, in order to implement an availability in proportion to the number of nodes 2, it is possible to use an asynchronous server 2C having a small processing load of the synchronizing process. Therefore, it is possible to suppress a decrease in availability by limiting the number of synchronous servers 2B while reducing an increase in the processing load of the synchronizing process in the primary server 2A.

Further, it has been described above that the switching controller 24 switches the operation mode of a node 2 at the timing when the failover is performed, but the present disclosure is not limited thereto.

For example, the switching controller 24 may switch the synchronous server 2B at regular intervals. As an example, the switching controller 24 may regularly execute a set of the above-described switching (demotion) from "synchronous standby" to "asynchronous standby" and switching (promotion) from "asynchronous standby" to "synchronous standby".

As a result, since it is possible to switch a synchronous server 2B whose latency has decreased due to an increase in the processing load during the operation of the cluster system 1 to an asynchronous server 2C having lower WAL latency than the synchronous server 2B, the performance degradation may be suppressed.

It has been described in the embodiment that the asynchronous servers 2C corresponding to the number of failed synchronous servers 2B are controlled to operate as the synchronous servers 2B, but the present disclosure is not limited thereto. The number of failed synchronous servers 2B may not be equal to the number of asynchronous servers 2C promoted to the synchronous servers 2B.

For example, even when a failure occurs in the synchronous server 2B, when the number of synchronous servers 2B operating in the cluster system 1 is greater than a predetermined number, the switching controller 24 of the primary server 2A may suppress the switching from the asynchronous server 2C to the synchronous server 2B. In this way, the process by the switching controller 24 may be executed when the number of synchronous servers 2B decreases to a predetermined number.

[1-3] Operation Examples

Next, operation examples of the cluster system 1 configured as described above will be described with reference to FIGS. 5 to 9.

[1-3-1] Operation Example When a Failure Occurs in a Primary Server

First, an operation example when a failure occurs in a primary server 2A-1 will be described focusing on the operation of synchronous servers (synchronous standby servers) 2B-1 to 2B-3 with reference to FIGS. 5 to 7.

Figure 5:
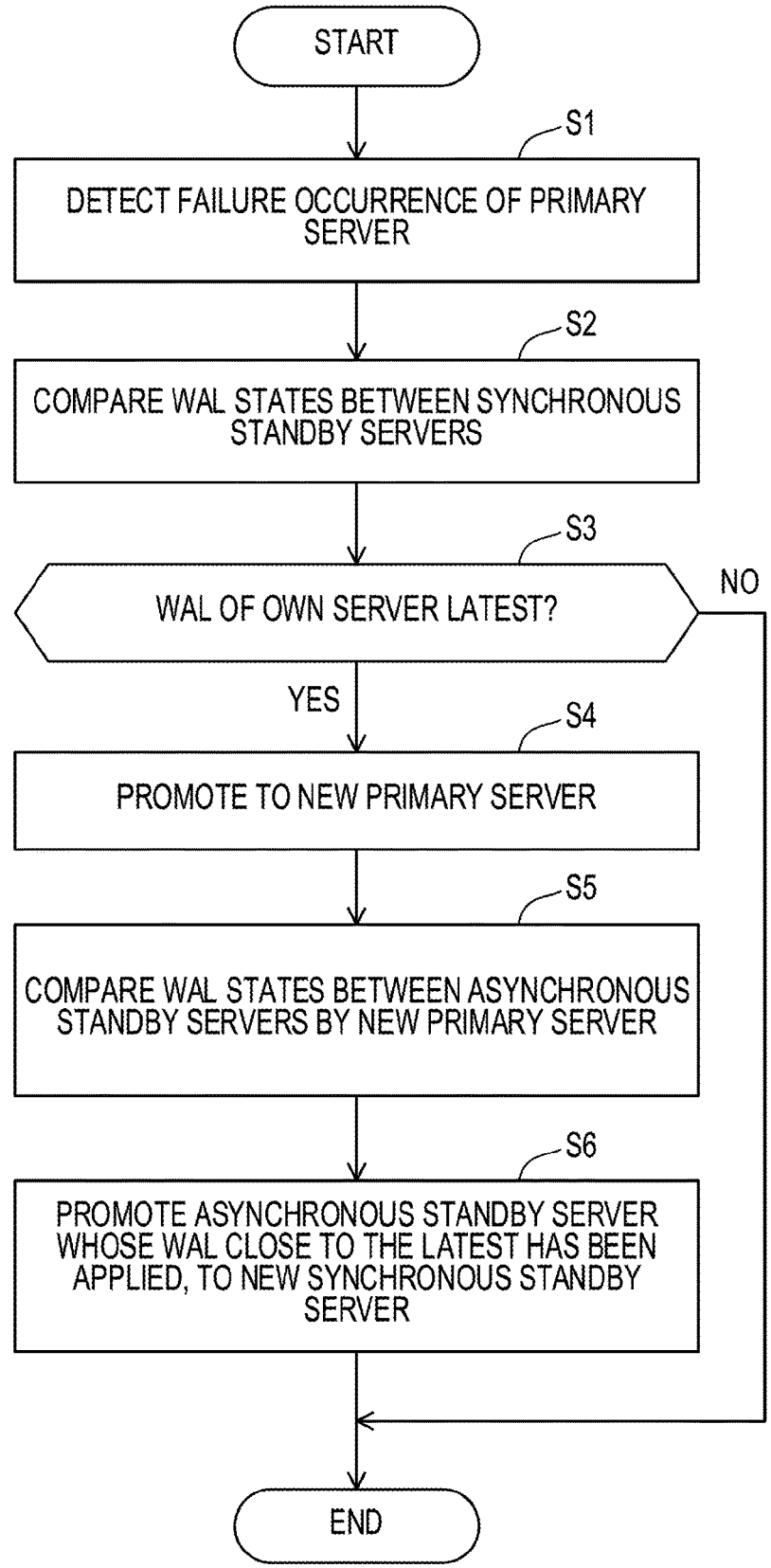
FIG. 5 is a flowchart illustrating an operation example of a synchronous standby server according to an embodiment.
Figure 6:
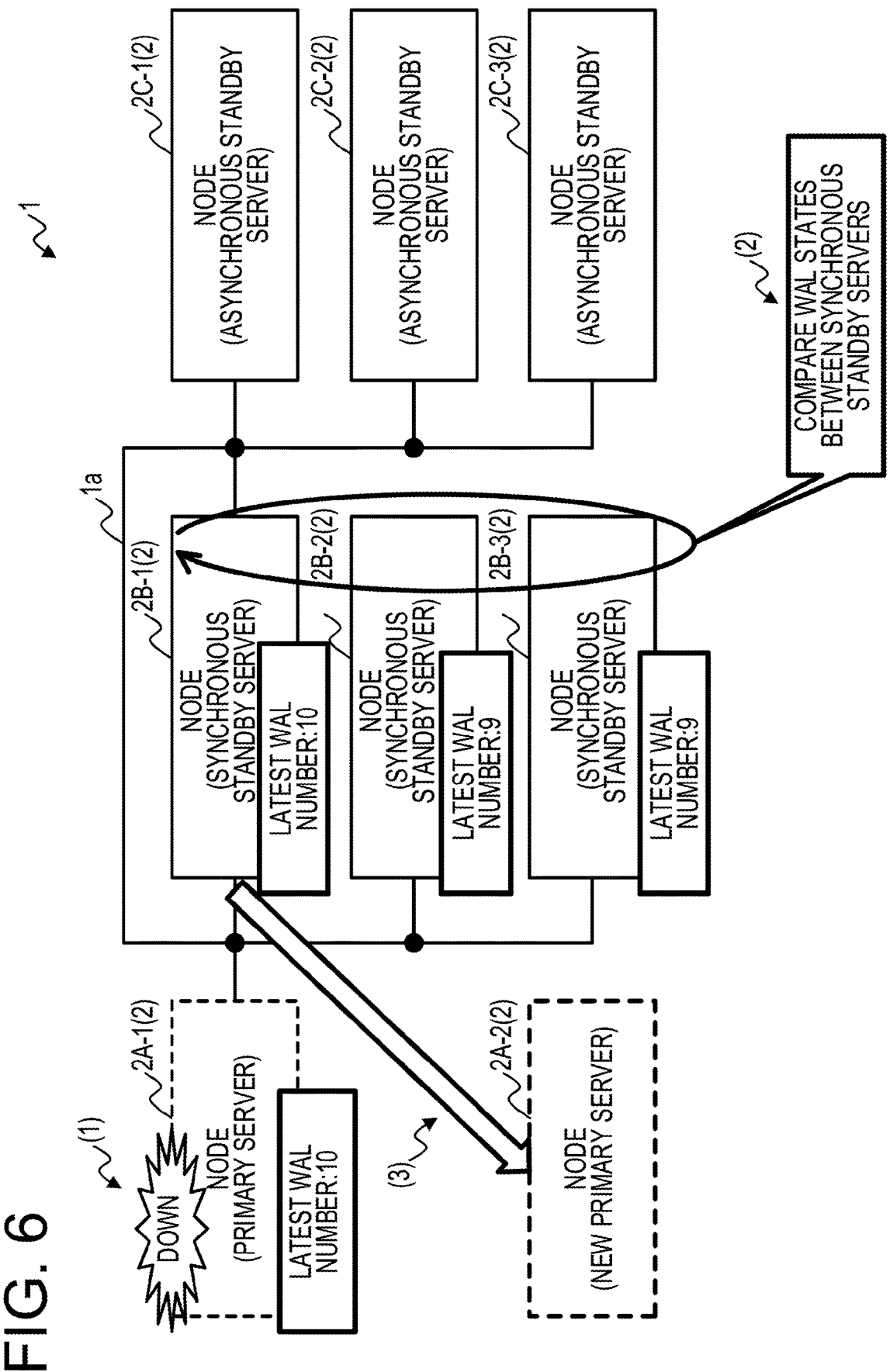
FIG. 6 is a view for explaining an operation example of the synchronous standby server illustrated in FIG. 5.

As illustrated in FIG. 5, the synchronous server 2B (and the asynchronous server 2C) detects that a failure accompanying server down has occurred in the primary server 2A-1 (see, e.g., FIG. 6) (step S1; see the arrow (1) in FIG. 6). Further, detecting an occurrence of a failure of a node 2 by another node 2 in the cluster system 1 may be implemented by various known methods.

Upon detecting an occurrence of a failure of the primary server 2A, the switching controller 24 of each of the synchronous servers 2B-1 to 2B-3 compares the WAL states among the synchronous servers 2B-1 to 2B-3 (step S2; see the arrow (2) in FIG. 6).

For example, the switching controller 24 of each synchronous server 2B may transmit the priority information 213 of its own node 2 to another synchronous server 2B and may compare the transmitted priority information 213 with the priority information 213 of another node 2 received from another synchronous server 2B. In addition, the synchronous server 2B may specify another synchronous server 2B by referring to, for example, the node information 212.

Then, as a result of the comparison of the WAL states, the switching controller 24 of each synchronous server 2B determines whether the WAL state of its own node 2 is the latest (e.g., whether the latest WAL has been applied) (step S3).

When it is determined that the WAL state of its own node 2 is not the latest ("No" in step S3), the process in the node 2 is ended.

In the meantime, when it is determined that the WAL state of its own node 2 is the latest ("Yes" in step S3), the node 2 is promoted to a new primary server 2A-2 (see, e.g., FIG. 6) (step S4; see the arrow (3) in FIG. 6).

In the example of FIG. 6, since the WAL number of the node 2B-1 is "10" and the WAL numbers of the nodes 2B-2 and 2B-3 are "9", the node 2B-1 having a large WAL number (latest) is promoted to the primary server 2A-2.

When there are plural synchronous servers 2B to which the latest WAL has been applied (i.e., when there are plural switching candidates), one synchronous server 2B of these switching candidates may be promoted to the primary server 2A-2 based on a rule shared in advance between the synchronous servers 2B. The rule may include, for example, one of the followings.

A node 2 having a small number (e.g., the smallest number) of the identification information of the node 2 included in the node information 212 is promoted to the primary server 2A-2.

A node 2 whose reception time of the latest WAL is ahead (e.g., the earliest) is promoted to the primary server 2A-2.

A node 2 with a good (e.g., best) WAL transfer efficiency based on the past statistics is promoted to the primary server 2A-2.

Based on one of the above rules, each node 2 that determines that the latest WAL has been applied to the plural nodes 2 including its own node 2 may determine whether its own node 2 is a target of promotion to the primary server 2A-2. In this case, the promotion target node 2 is promoted to the primary server 2A-2 following the "Yes" route in step S3. In the meantime, for a node 2 which is not to be promoted, the process is ended following the "No" route in step S3.

Information such as the WAL reception time and the past statistics may be shared between the nodes 2 by the multi-synchronous standby function. Alternatively, in step S2, the switching controller 24 of each synchronous server 2B may transmit the information such as the WAL reception time and the past statistics of its own node 2, together with its own priority information 213, to another node 2.

Subsequently, the switching controller 24 of the node 2 promoted to the primary server 2A-2 compares the WAL states of the asynchronous servers 2C-1 to 2C-3 (step S5; see the arrow (4) in FIG. 7). For example, the switching controller 24 of the primary server 2A-2 may transmit an acquisition request of the priority information 213 to each of the asynchronous servers 2C-1 to 2C-3 specified based on the node information 212 and may compare the priority information 213 received from the asynchronous servers 2C.

As a result of the comparison between the WAL states, the switching controller 24 of the primary server 2A-2 specifies an asynchronous server 2C whose WAL state is close to the latest (e.g., the WAL close to the latest has been applied). Then, the switching controller 24 of the primary server 2A-2 promotes the asynchronous server 2C whose WAL state is close to the latest, to a new synchronous server 2B-4 (see, e.g., FIG. 7) (step S6; see the arrow (5) in FIG. 7) and the process is ended.

Figure 7:
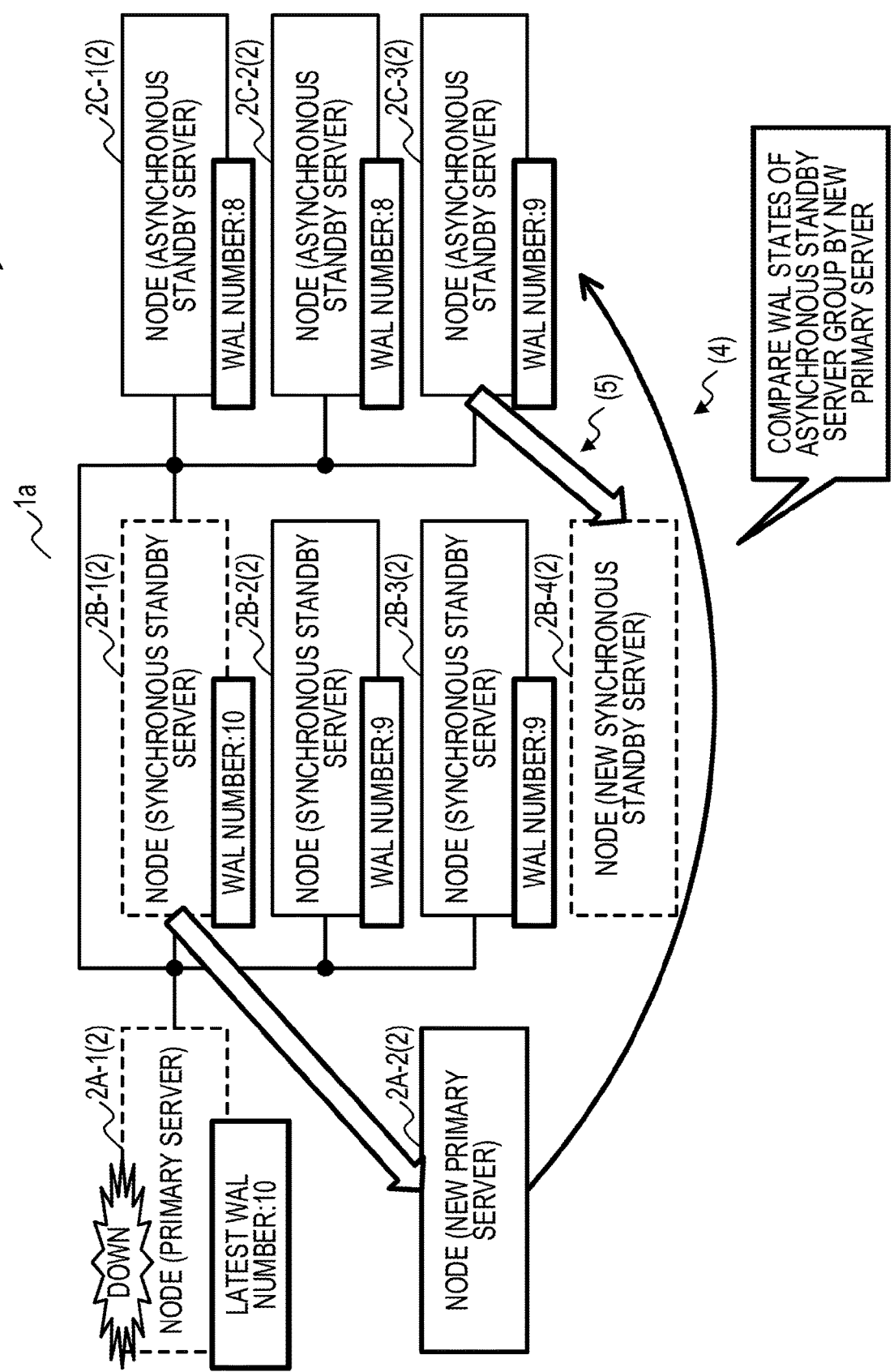
FIG. 7 is a view for explaining an operation example of the synchronous standby server illustrated in FIG. 5.

In the example of FIG. 7, since the WAL number of each of the nodes 2C-1 and 2C-2 is "8" and the WAL number of the node 2C-3 is "9", the node 2C-3 having a large WAL number (close to the latest) is promoted to the synchronous server 2B-4.

When there are plural asynchronous servers 2C whose WAL number is close to the latest (i.e., when there are plural switching candidates), the switching controller 24 of the primary server 2A-2 may promote any one asynchronous server 2C of the switching candidates to the synchronous server 2B. The criterion for promotion may be the same as the above-mentioned rules used to determine the promotion from the synchronous server 2B to the primary server 2A.

The result of switching the operation mode of the node 2 described above may be reflected in the node information 212, for example, by the multi-synchronous standby function executed in each node 2. In addition, the WAL number, which is an example of the priority information 213, may be updated according to the execution of the updating process by the primary server 2A and the synchronizing process by each node 2.

[1-3-2] Operation Example When a Failure Occurs in a Synchronous Standby Server

Next, an operation example when a failure occurs in a synchronous server (synchronous standby server) 2B-1 will be described focusing on the operation of a primary server 2A-1 with reference to FIGS. 8 and 9.

Figure 8:
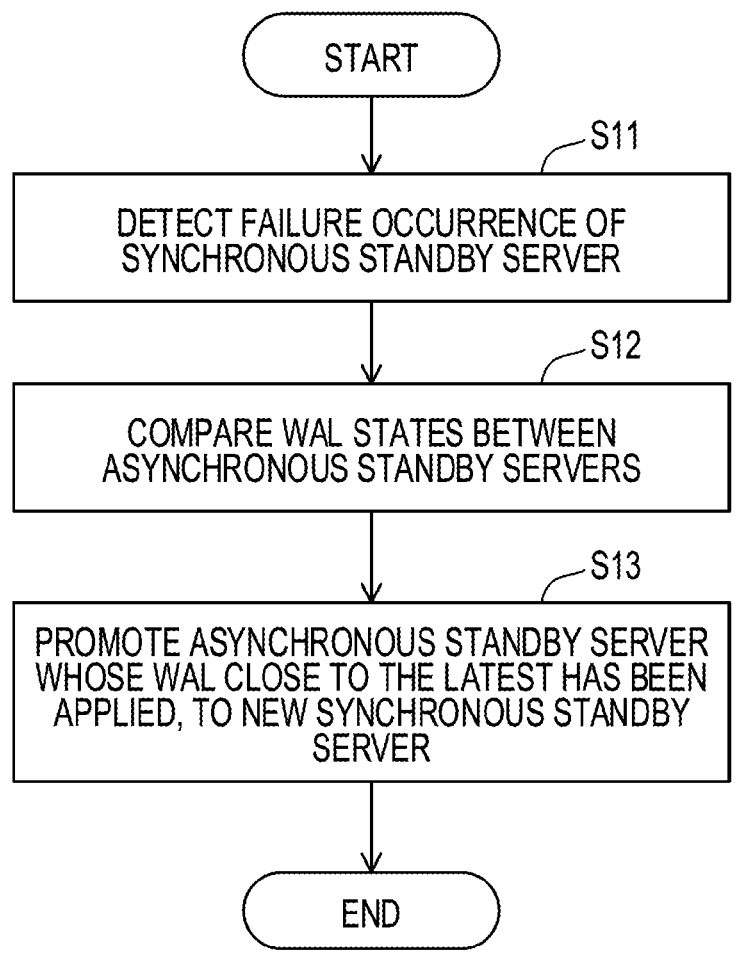
FIG. 8 is a flowchart illustrating an operation example of a primary server according to an embodiment.
Figure 9:
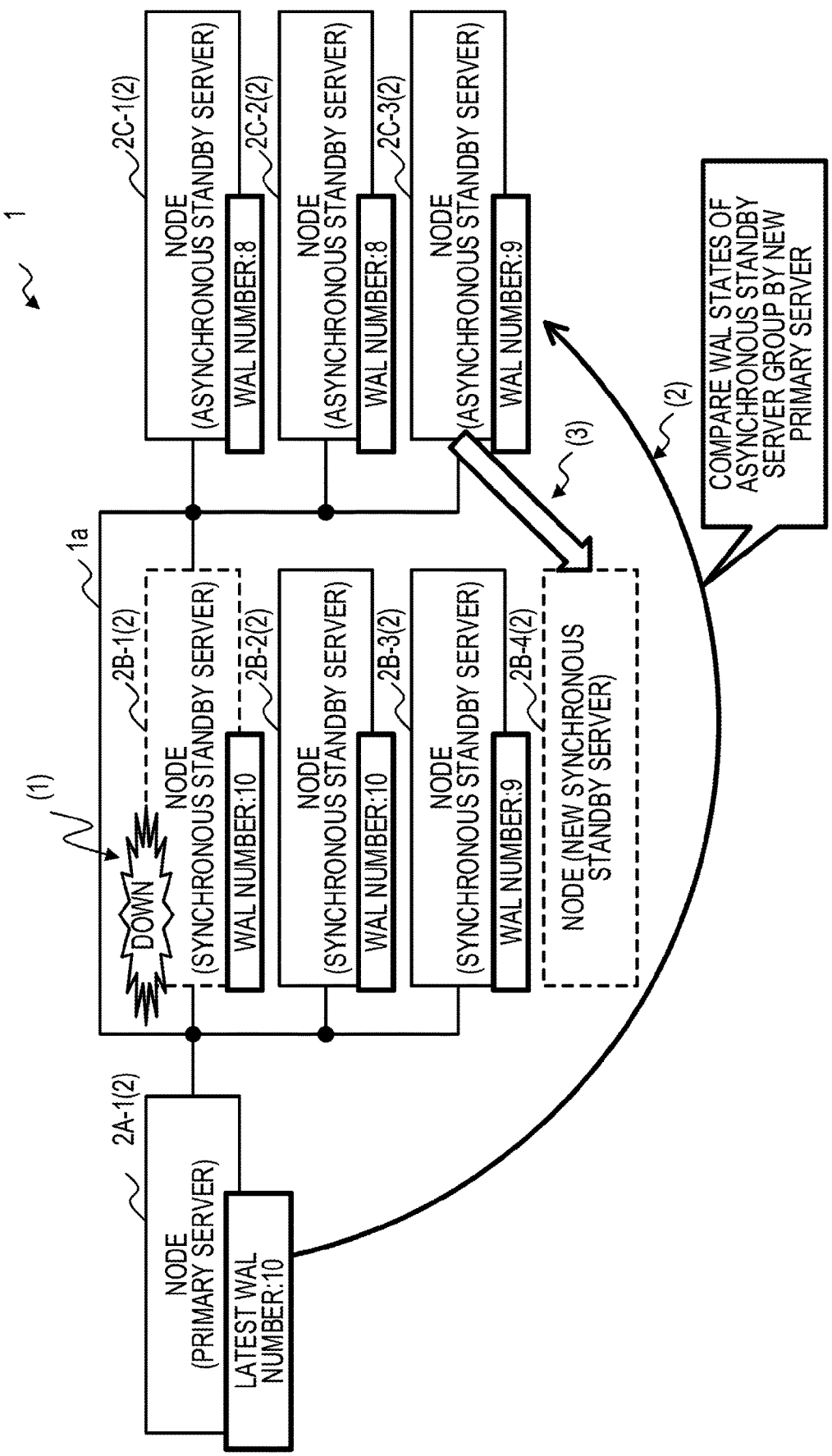
FIG. 9 is a view for explaining an operation example of the primary server illustrated in FIG. 8.

As illustrated in FIG. 8, the primary server 2A-1 detects that a failure accompanying server down has occurred in the synchronous server 2B-1 (see, e.g., FIG. 9) (step S11; see the arrow (1) in FIG. 9).

The switching controller 24 of the primary server 2A-1 compares the WAL states of the asynchronous servers 2C-1 to 2C-3 (step S12; see the arrow (2) in FIG. 9). For example, the switching controller 24 of the primary server 2A-1 may transmit an acquisition request of the priority information 213 to each of the asynchronous servers 2C-1 to 2C-3 specified based on the node information 212 and may compare the priority information 213 received from the asynchronous servers 2C.

As a result of the comparison between the WAL states, the switching controller 24 of the primary server 2A-1 specifies an asynchronous server 2C whose WAL state is close to the latest (e.g., the WAL close to the latest has been applied). Then, the switching controller 24 of the primary server 2A-1 promotes the asynchronous server 2C whose WAL state is close to the latest, to a new synchronous server 2B-4 (see, e.g., FIG. 9) (step S13; see the arrow (3) in FIG. 9) and the process is ended.

In the example of FIG. 9, since the WAL number of each of the nodes 2C-1 and 2C-2 is "8" and the WAL number of the node 2C-3 is "9", the node 2C-3 having a large WAL number (close to the latest) is promoted to the synchronous server 2B-4.

When there are plural asynchronous servers 2C whose WAL number is close to the latest (i.e., when there are plural switching candidates), the switching controller 24 of the primary server 2A-1 may promote any one asynchronous server 2C of the switching candidates to the synchronous server 2B. The criterion for promotion may be the same as the above-mentioned rules used to determine the promotion from the synchronous server 2B to the primary server 2A.

As described above, the switching controller 24 of the node 2 operating as the primary server 2A is an example of a controller or a first controller that performs a process that may include controlling at least one asynchronous server 2C to operate as a synchronous server 2B when the number of synchronous servers 2B decreases due to a failure in at least one node 2 in the cluster system 1.

[1-4] Hardware Configuration Example

Next, a hardware configuration example of the node 2 and the node 3 according to an embodiment will be described with reference to FIG. 10. Since the node 2 and the node 3 may have the same hardware configuration, an example of the hardware configuration of a computer 10 will be described below.

Figure 10:
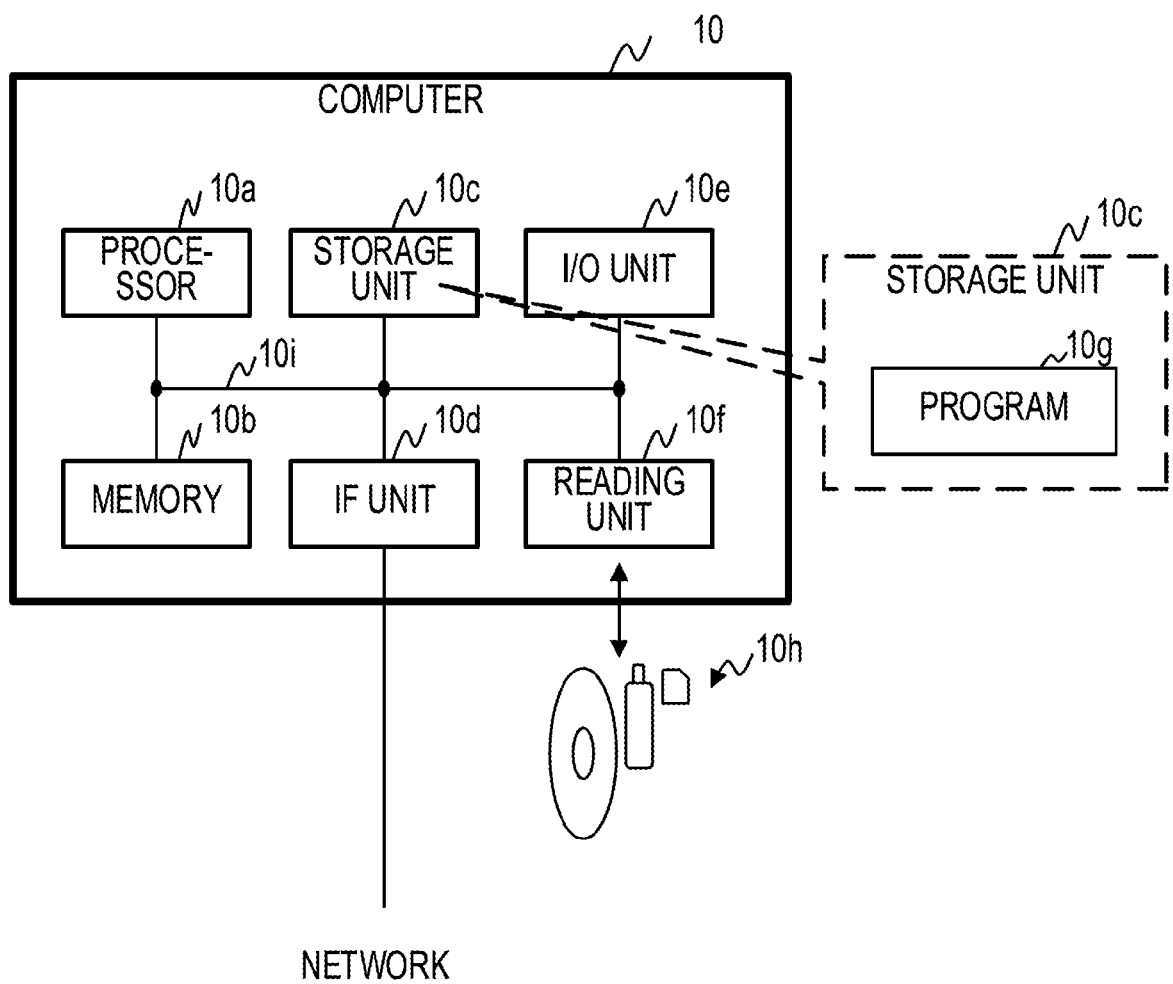
FIG. 10 is a view illustrating a hardware configuration example of a computer according to an embodiment.

As illustrated in FIG. 10, the computer 10 may include, for example, a processor 10a, a memory 10b, a storage unit 10c, an IF (interface) unit 10d, an I/O (input/output) unit 10e, and a reading unit 10f.

The processor 10a is an example of an arithmetic processing device that performs various controls and arithmetic operations. The processor 10a may be communicably connected to each block in the computer 10 via a bus 10i. As for the processor 10a, an integrated circuit (IC) such as, for example, a CPU, an MPU (micro processing unit), a GPU (graphics processing unit), an APU (accelerated processing unit), a DSP (digital signal processor), an ASIC (application specific IC), or an FPGA (field-programmable gate array) may be used.

The memory 10b is an example of hardware that stores information such as various data and programs. As for the memory 10b, a volatile memory such as, for example, a RAM may be used.

The storage unit 10c is an example of hardware that stores information such as various data and programs. As for the storage unit 10c, a magnetic disk device such as, for example, an HDD, a semiconductor drive device such as, for example, an SSD, and various storage devices such as, for example, a nonvolatile memory may be used. An example of the nonvolatile memory may include a flash memory, an SCM (storage class memory), or a ROM (read only memory).

In addition, the DB 21 of the node 2 illustrated in FIG. 2 may be implemented by, for example, a memory area of at least one of the memory 10b and the storage unit 10c of the node 2.

Further, the storage unit 10c may store a program 10g that implements all or a portion of the various functions of the computer 10. The processor 10a deploys and executes the program 10g stored in the storage unit 10c on the memory 10b to implement the functions as the primary server 2A, the synchronous server 2B, the asynchronous server 2C, or the AP server 3 illustrated in FIG. 1.

For example, in the node 2, the processor 10a of the node 2 may implement the functions of the node 2 according to the operation mode by deploying the program 10g stored in the storage unit 10c (server switching program) on the memory 10b and executing an arithmetic process. These functions may include the functions of the DB controller 22, the synchronization controller 23, and the switching controller 24.

Further, in the AP server 3, the processor 10a of the AP server 3 may implement the functions of the AP server 3 by deploying the program 10g stored in the storage unit 10c on the memory 10b and executing an arithmetic process.

The IF unit 10d is an example of a communication interface that performs control of connection and communication with the network 1a, 1b, or 5. For example, the IF unit 10d may include a LAN or an adapter conforming to optical communication (e.g., FC (fiber channel)).

For example, the program 10g of the node 2 may be downloaded from the network 5 to the computer 10 via the communication interface and the network 1b (or a management network) and stored in the storage unit 10c. Further, for example, the program 10g of the node 3 may be downloaded from the network 5 to the computer 10 via the communication interface and stored in the storage unit 10c.

The I/O unit 10e may include one or both of an input unit such as a mouse, a keyboard, or an operation button and an output unit such as a monitor such as a touch panel display or an LCD (liquid crystal display), a projector, or a printer.

The reading unit 10f is an example of a reader that reads data and program information recorded on a recording medium 10h. The reading unit 10f may include a connection terminal or a device capable of connecting or inserting the recording medium 10h. As for the reading unit 10f, for example, an adapter conforming to USB (universal serial bus), a drive device accessing a recording disk, and a card reader accessing a flash memory such as an SD card may be used. Further, the program 10g may be stored in the recording medium 10h, and the reading unit 10f may read the program 10g from the recording medium 10h and store the read program 10g in the storage unit 10c.

The recording medium 10h may include, for example, a non-transitory recording medium such as a magnetic/optical disk or a flash memory. The magnetic/optical disks may include, for example, a flexible disk, a CD (compact disc), a DVD (digital versatile disc), a Blu-ray disc, or an HVD (holographic versatile disc). The flash memory may include, for example, a USB memory or an SD card. The CD may include, for example, a CD-ROM, a CD-R, or a CD-RW. The DVD may include, for example, a DVD-ROM, a DVD-RAM, a DVD-R, a DVD-RW, a DVD+R, or DVD+RW.

The hardware configuration of the computer 10 described above is merely an example. Therefore, increase or decrease (e.g., addition or deletion of arbitrary blocks), division, and integration by arbitrary combination of hardware or addition or deletion of a bus in the computer 10 may be performed as appropriate.

[2] Others

The above-described techniques according to the embodiment may be modified and changed as follows.

For example, at least one function of the DB controller 22, the synchronization controller 23, and the switching controller 24 illustrated in FIG. 2 may be merged or divided.

In addition, the processor 10a of the computer 10 illustrated in FIG. 10 is not limited to a single processor or a single core processor but may be a multiprocessor or a multi-core processor.

Further, in the embodiment, a quorum configuration may be employed. The quorum configuration is, for example, a multi-node cluster configuration in which plural node groups are not generated so that the primary server 2A is unique within the DB multiplexing environment.

Figure 11:
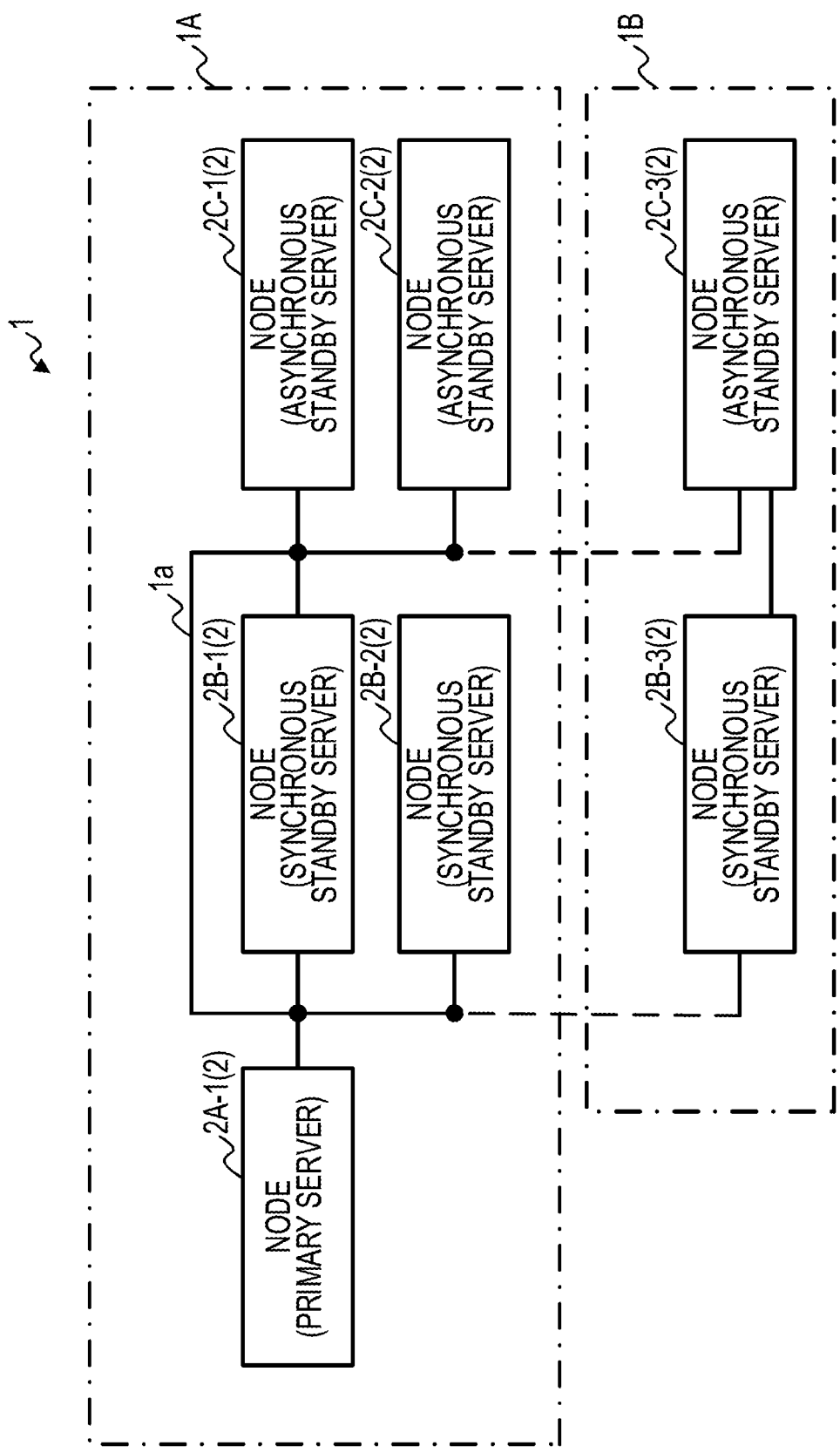
FIG. 11 is a block diagram illustrating a configuration example of a cluster system according to an embodiment.

As illustrated in FIG. 11, a case is considered where the cluster system 1 is divided into a node group 1A and a node group 1B due to a failure of the network 1a (e.g., a line division). The node group 1A includes the primary server 2A, the synchronous servers 2B-1 and 2B-2, and the asynchronous servers 2C-1 and 2C-2. The node group 1B includes the synchronous server 2B-3 and the asynchronous server 2C-3.

In this example, in the node group 1B, when the switching controller 24 of the synchronous server 2B-3 is promoted to the primary server 2A, together with the primary server 2A of the node group 1A, two primary servers 2A exists in the cluster system 1.

In order to avoid such a situation, for example, when each node 2 becomes unable to communicate with more than half of the number of nodes 2 constituting the cluster system 1, it is determined that its own node 2 belongs to a node group for which quorum is not established, and the own node 2 may leave the cluster configuration.

In the example of FIG. 11, since each of the synchronous server 2B-3 and the asynchronous server 2C-3 of the node group 1B may not communicate with four nodes 2, which is the majority or more of seven servers making up the cluster system 1, it leaves the cluster configuration.

In the meantime, since the primary server 2A of the node group 1A may communicate with the four nodes, it is determined that the two synchronous servers 2B are shut down, and control may be performed to switch the two asynchronous servers 2C to the synchronous server 2B.

In the leaving state, since the primary server 2A is not switched, the synchronous server 2B and the asynchronous server 2C are not subjected to a change of the operation mode such as promotion. When the communication is recovered by restoration of the network 1a, the leaved node 2 may again participate in the quorum configuration.

When the number of nodes 2 constituting the cluster system 1 is an even number, it is possible to implement the quorum configuration by operating any one of the nodes 2 as an arbitrage server in which the DB 21 storing the user data 211 does not exist (out of the synchronization target).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    detecting a decrease in a number of at least one synchronous backup server, which is included in a server system and backs up data of a primary server included in the server system in a synchronous manner, by a first predetermined number; and
    upon detecting the decrease in the number of at least one synchronous backup server, controlling each of one or more of at least one asynchronous backup server, which is included in the server system and backs up data of the primary server in an asynchronous manner, to operate as a synchronous backup server such that the number of at least one synchronous backup server is adjusted within a predetermined upper limit value.

2. The non-transitory computer-readable recording medium according to claim 1, the process further comprising: controlling the first predetermined number of asynchronous backup servers among the at least one asynchronous backup server to operate as a synchronous backup server.

3. The non-transitory computer-readable recording medium according to claim 1, the process further comprising: executing the controlling when the number of the at least one synchronous backup server decreases to a second predetermined number.

4. The non-transitory computer-readable recording medium according to claim 1, the process further comprising: switching each of the one or more of the at least one asynchronous backup server to a synchronous backup server based on a synchronization state of the at least one asynchronous backup server with respect to the primary server.

5. The non-transitory computer-readable recording medium according to claim 4, the process further comprising: determining the synchronization state with respect to the primary server based on write ahead logging (WAL) information.

6. The non-transitory computer-readable recording medium according to claim 1, the process further comprising: controlling, when a failure occurs in the primary server, one of the at least one synchronous backup server to operate as a new primary server and control one of the at least one asynchronous backup server to operate as a synchronous backup server.

7. A method of switching a server, the method comprising:
detecting, by a computer, a decrease in a number of at least one synchronous backup server, which is included in a server system and backs up data of a primary server included in the server system in a synchronous manner, by a first predetermined number; and
upon detecting the decrease in the number of at least one synchronous backup server, controlling each of one or more of at least one asynchronous backup server, which is included in the server system and backs up data of the primary server in an asynchronous manner, to operate as a synchronous backup server such that the number of at least one synchronous backup server is adjusted within a predetermined upper limit value.

8. The method according to claim 7, further comprising: controlling the first predetermined number of asynchronous backup servers among the at least one asynchronous backup server to operate as a synchronous backup server.

9. The method according to claim 7, further comprising: executing the controlling when the number of the at least one synchronous backup server decreases to a second predetermined number.

10. The method according to claim 7, further comprising: switching each of the one or more of the at least one asynchronous backup server to a synchronous backup server based on a synchronization state of the at least one asynchronous backup server with respect to the primary server.

11. The method according to claim 10, further comprising: determining the synchronization state with respect to the primary server based on write ahead logging (WAL) information.

12. The method according to claim 7, further comprising: controlling, when a failure occurs in the primary server, one of the at least one synchronous backup server to operate as a new primary server and control one of the at least one asynchronous backup server to operate as a synchronous backup server.

13. A server system, comprising:
a primary server including:
a first memory; and
a first processor coupled to the first memory; and
at least one synchronous backup server, each including:
a second memory; and
a second processor coupled to the second memory and the second processor configured to:
back up data of the primary server in a synchronous manner; and
at least one asynchronous backup server, each including:
a third memory; and
a third processor coupled to the third memory and the third processor configured to:
back up data of the primary server in an asynchronous manner,
wherein the first processor is configured to: control each of one or more of the at least one asynchronous backup server to operate as a synchronous backup server when detecting that a number of the at least one synchronous backup server decreases due to a failure in the at least one synchronous backup server included in the server system such that the number of at least one synchronous backup server is adjusted within a predetermined upper limit value.

14. The server system according to claim 13, wherein the first processor is further configured to: control a same number of asynchronous backup servers as a decreased number of synchronous backup servers among the at least one synchronous backup server to operate as a synchronous backup server.

15. The server system according to claim 13, wherein the first processor is further configured to: execute the control when the number of the at least one synchronous backup server decreases to a predetermined number.

16. The server system according to claim 13, wherein the first processor is further configured to: switch each of the one or more of the at least one asynchronous backup server to a synchronous backup server based on a synchronization state of the at least one asynchronous backup server with respect to the primary server.

17. The server system according to claim 16, wherein the first processor is further configured to: determine the synchronization state with respect to the primary server based on write ahead logging (WAL) information.

18. The server system according to claim 13, wherein the first processor is further configured to: control, when a failure occurs in the primary server, one of the at least one synchronous backup server to operate as a new primary server and control one of the at least one asynchronous backup server to operate as a synchronous backup server.

19. A method of switching a server, the method comprising:
detecting a failure in a primary server included in a server system by at least one synchronous backup server or by at least one asynchronous backup server included in the server system and backs up data of the primary server;
upon detecting the failure in the primary server, promoting the at least one synchronous backup server to operate as a new primary server;
comparing a synchronization state of the at least one asynchronous backup server with respect to the primary server; and
promoting the at least one asynchronous backup server to operate as a new synchronous backup server such that a number of at least one synchronous backup server is adjusted within a predetermined upper limit value.

20. The non-transitory computer-readable recording medium according to claim 1, wherein at the controlling, the number of at least one synchronous backup server is increased from a decreased number of at least one synchronous backup server within the predetermined upper limit value.

\* \* \* \* \*